United States Patent [19]

Hyodo et al.

[11] Patent Number: 4,556,861

[45] Date of Patent: Dec. 3, 1985

[54] AUTOMOBILE SPEED CONTROL SYSTEM

[75] Inventors: Hitoshi Hyodo, Okazaki; Naoji Sakakibara, Chiryu, both of Japan

[73] Assignee: Aisin Seiki K.K., Kariya, Japan

[21] Appl. No.: 453,990

[22] Filed: Dec. 28, 1982

[30] Foreign Application Priority Data

Dec. 28, 1981 [JP] Japan .................. 56-213034

[51] Int. Cl.⁴ .......................................... G08B 21/00
[52] U.S. Cl. ....................................... 340/62; 181/171; 181/179
[58] Field of Search ................... 340/62; 180/171, 179

[56] References Cited

U.S. PATENT DOCUMENTS

| | | | |
|---|---|---|---|
| 2,990,825 | 7/1961 | Fuller et al. | ........................ 180/171 |
| 3,793,622 | 2/1974 | Hida et al. | ............................ 340/62 |
| 4,202,424 | 5/1980 | Sakakibara et al. . | |
| 4,433,746 | 2/1984 | Steel | .................................... 180/171 |

*Primary Examiner*—Glen R. Swann, III
*Attorney, Agent, or Firm*—Sughrue, Mion, Zinn Macpeak & Seas

[57] ABSTRACT

An automobile speed control system is provided with a speed signal generator circuit for generating first electrical signal indicative of actual automobile speed and a desired automobile signal supply circuit for supplying a second electrical signal indicative of the desired automobile speed. The first and second signals are compared to provide a throttle valve control signal and an alarm circuit including an audible and/or visual alarm is provided to warn the driver when the actual automobile speed exceeds a pre-set speed.

4 Claims, 4 Drawing Figures

AUTOMOBILE SPEED CONTROL SYSTEM

BACKGROUND OF THE INVENTION

The present invention is directed to an automobile speed control system for controlling an automobile at the desired speed, more particularly to a set, memory and cancel circuit arranged in an automobile speed control system for maintaining a constant speed.

In such control systems, the actual speed of an automobile is detected as a pulse frequency and the actual speed signal is obtained by an analog voltage level which is proportional to the pulse frequency. The memory circuit sets or memorizes the actual automobile speed signal at the moment a desired speed set switch is closed. This memorized automobile speed signal is then used as a reference signal by a comparator circuit and on the basis of the difference between the reference signal and the actual automobile speed, the automobile speed control signal system will control the setting of the throttle valve to a position at which the difference will be zero.

In such control systems, the constant speed control operation may be cancelled by the momentary closure of a brake signal switch in order to avoid potential dangers. In order to revert to the automatically controlled constant speed for the operation of the automobile, the driver merely operates a resume switch or set switch in order to close it momentarily. However, when there are obstacles on the road, for instance, when the interval between automobiles becomes too short or when the automobile is about to enter a sharp curve, the driver operates the brake pedal to cancel the constant speed control operation. If the automobile is then driven without the benefit of the constant speed control system for a substantial length of time, the driver will often forget the desired speed that was memorized previously. Thus, when there are no longer any obstacles on the road, the driver can accelerate the automobile to the desired speed. If the driver operates the resume switch to drive the automobile under the control of the constant speed system after the actual automobile speed has exceeded the previously memorized desired speed, the actual speed will be decreased by the constant speed control system to conform the speed to the desired memorized speed. However, if the driver has forgotten that the actual speed is over the previously memorized desired speed at the time the resume switch is operated, the sudden decrease in the actual speed under the control of the speed control system may cause some anxiety to the driver since the driver may feel that the automobile is operating improperly. When the resume operation is performed while the actual speed is under the previously memorized desired speed, the automatic control will cause the automobile speed to increase to the desired memorized speed which does not cause the driver as much concern as the aforementioned situation.

SUMMARY OF THE INVENTION

The present invention provides a new and improved automobile speed control system which provides an alarm for the driver when the actual automobile speed rises above a predetermined speed.

The present invention provides a new and improved automobile speed control system wherein the alarm function is relatively compact and low in cost since it utilizes an existing function of an automobile speed control system. The automobile speed control system cannot control the automobile after the constant speed control is cancelled. However, the desired speed is still memorized after cancelling the constant speed control, and the signals are supplied to the output of the frequency-voltage converting circuit and the memory circuit. If the acutal speed is higher than a certain predetermined speed when the constant speed control is cancelled, the alarm circuit is energized. Means are also provided for readily changing the speed at which the alarm will be activated without unduly complicating the circuitry involved.

The foregoing and other objects features and advantages of the invention will be apparent from the following more particular description of a preferred embodiment of the invention as illustrated in the accompanying drawings.

DETAILED DESCRIPTION OF THE INVENTION

Figure 1A:
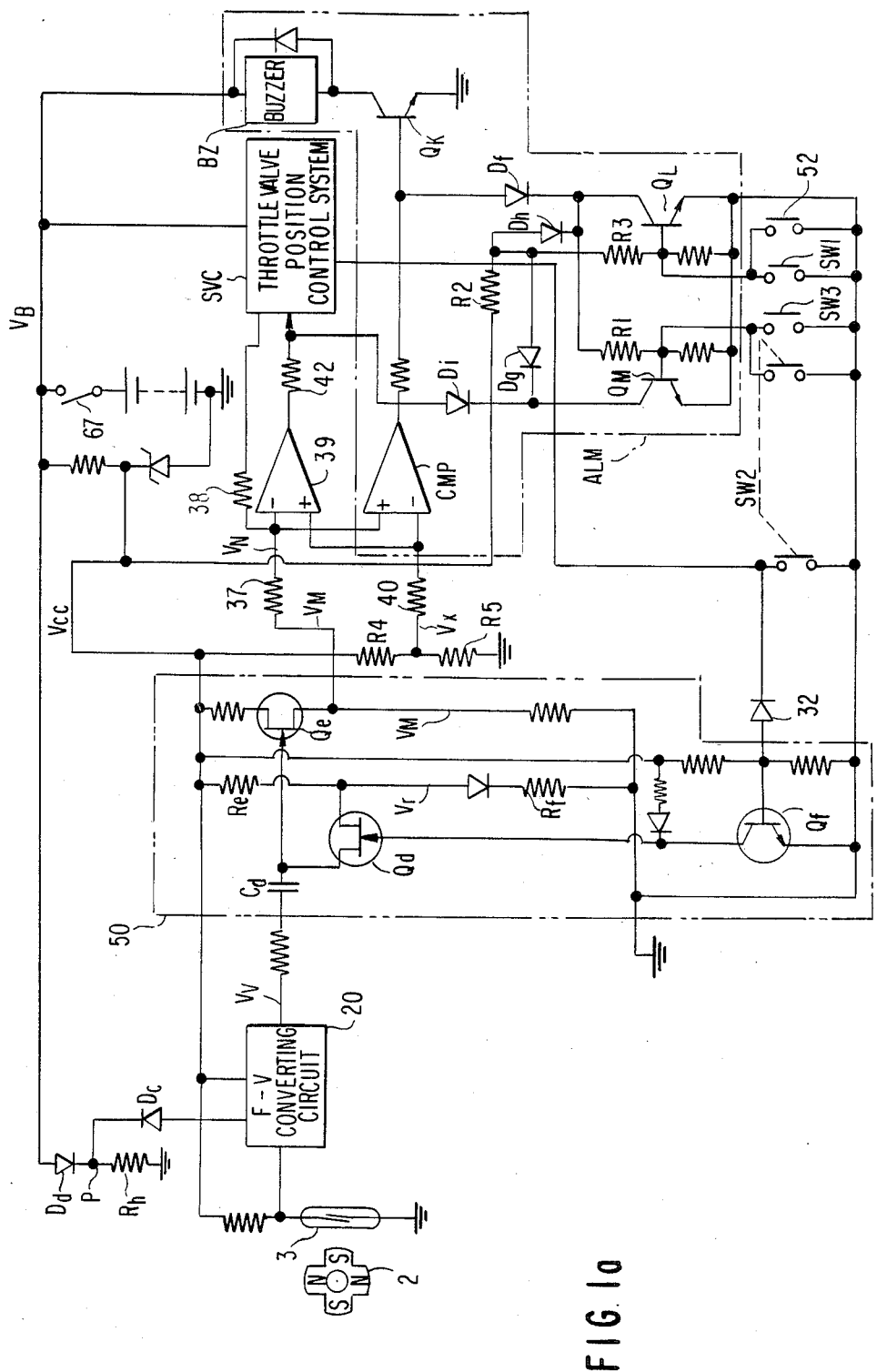
FIG. 1a is a circuit diagram showing a first embodiment of the present invention.

With reference to FIG. 1a of the drawings, the frequency-voltage converting circuit 20 receives an actual speed signal from a reed switch 3 which opens and closes repeatedly in synchronism with the rotation of a magnet 2 which is driven at the same speed as the speedometer cable of an automobile. The frequency-voltage converting circuit 20 supplies an actual speed voltage signal $V_V$ which corresponds with the actual speed signal. Memory circuit 50 memorizes the actual speed voltage $V_V$ at the moment a set switch $SW_2$ is operated by means of the capacitor $C_d$ and provides a memory voltage output signal $V_M$ which corresponds to the actual voltage signal $V_V$. A comparator 39 compares a voltage $V_N$ which is the sum of the memory voltage signal $V_M$ and the feedback signal corresponding to the driving signal of a fuel injector of the throttle valve position control system SVC with the comparative voltage $V_x$ and as a result supplies a low level output of the comparator 39 when the voltage $V_N$ is higher than the voltage $V_x$ while the high level output $V_{cc}$ of the comparator 39 is supplied when the voltage $V_N$ is lower than the voltage $V_x$. The throttle valve position control system SVC causes the throttle valve to open thereby increasing the actual speed when the output of the comparator 39 is at a high level while the throttle valve position control system SVC causes the throttle valve to close thereby decreasing the actual speed when the output is at a low level. An alarm circuit ALM according to the present invention includes a circuit which sets or memorizes and cancels the constant speed control by set switch $SW_2$, resume switch $SW_3$, reset switch $SW_1$ and brake switch 52. A buzzer BZ and a transistor $Q_K$ for switching means are also provided. A comparator CMP receives the voltage $V_N$, at the non-inverting input terminal (+) and the voltage $V_x$ at the inverting input terminal (−). A circuit having transistors $Q_L$ and $Q_M$ constitutes a set-reset flip-flop circuit.

When the power switch 67 is ON, whenever the voltage $V_N$ becomes lower than the voltage $V_x$, the output of the comparator 39 is at a high level and the output of the comperator CMP is at a low level. Therefore, the low level voltage is applied to the base of the transistor $Q_M$ through the diode $D_f$ and the resistor $R_1$ whereby the transistor $Q_M$ turns OFF. Since the collector of the transistor $Q_M$ is at a high level, the diode is biased in reverse and therefore, the base of the transistor $Q_L$ receives a high level voltage through the resistors $R_2$ and $R_3$ and the transistor $Q_L$ turns ON. Under these conditions, the automobile speed control system is already set so as to run at a constant speed and when the actual speed is less than the desired speed ($V_N<V_x$), the output of the comparator 39, which is at a high level voltage drives the throttle valve position control system while when the actual speed is higher than the desired speed ($V_N>V_x$), the output of comparator 39 which is a low level voltage stops to drive SVC. In the case of the output of the comparator being a high level whereby $V_N>V_x$, because the transistor $Q_L$ is ON and a base of the transistor $Q_K$ is held at a low level, the transistor $Q_K$ is OFF and the buzzer BZ is OFF. When the reset switch $SW_1$ or the brake switch 52 is ON, the base of the transistor $Q_L$ is at a low level and the transistor $Q_L$ turns OFF and the base of the transistor $Q_M$ receives a high level voltage through the resistors $R_1$ and $R_2$ and the diode $D_h$ so that the transistor $Q_M$ turns ON. Under these conditions the input of the throttle valve position control system SVC is connected to the ground through the diode $D_i$ and the transistor $Q_M$ and therefore SVC is OFF regardless of the actual speed. Since the transistor is in the OFF condition, when the actual speed rises over the memory speed ($V_N>V_x$) the output of the comperator CMP turns to the high level and the base of the transistor $Q_K$ receives a high level voltage so that the transistor $Q_K$ turns ON and the buzzer BZ is driven to sound an alarm. When the set switch $SW_2$ or the resume switch $SW_3$ is ON, the base of the transistor $Q_M$ is grounded and the transistor $Q_M$ turns OFF so that the base of the transistor $Q_L$ receives a high level voltage and the transistor $Q_L$ turns ON. Therefore, the constant speed control is set.

Figure 1B:
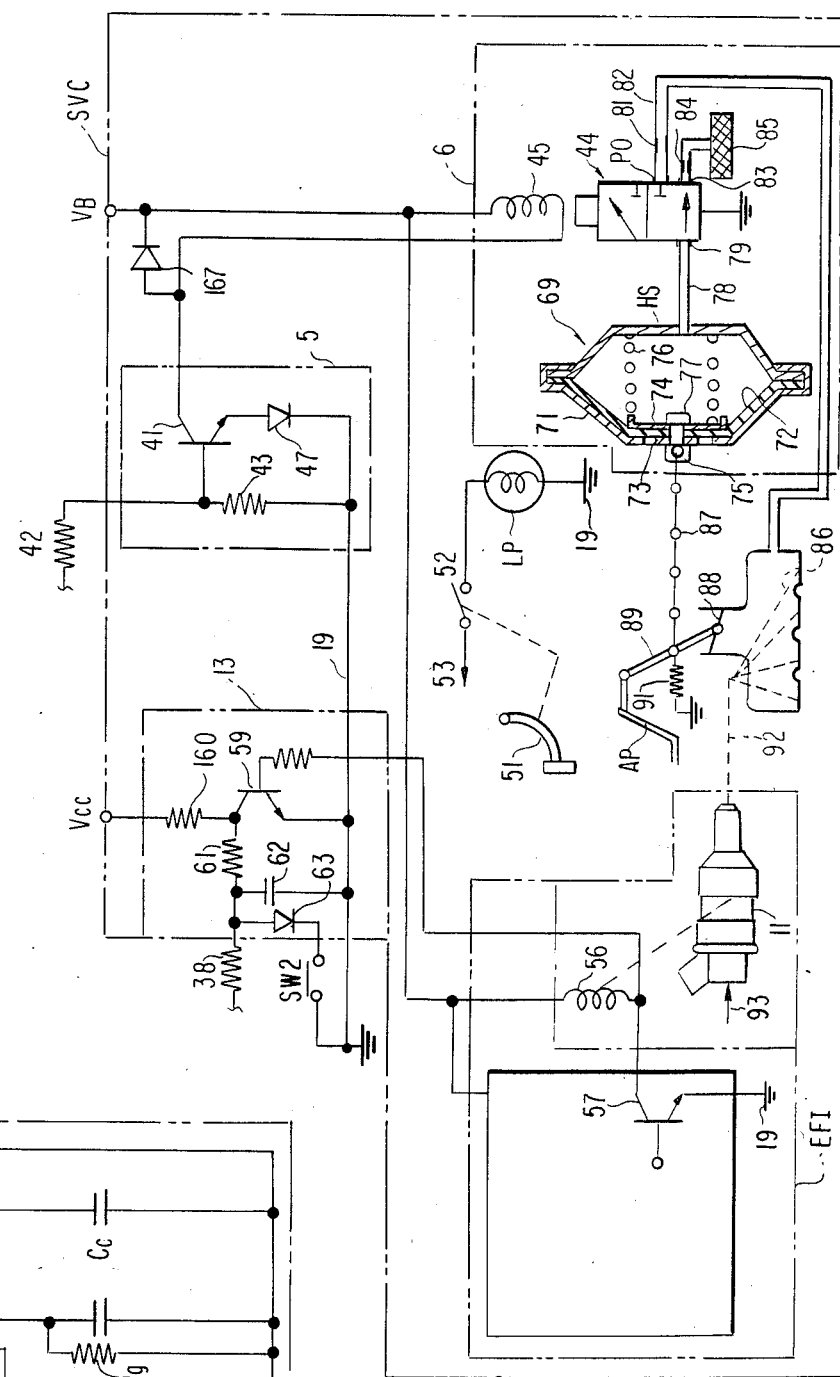
FIG. 1b is a circuit diagram showing a frequency-voltage converting circuit of FIG. 1a in detail.

Referring to FIG. 1b, the frequency-voltage converting circuit 20 converts the actual speed signal into a voltage level which pulsates between the constant voltage level and the ground level and supplies this voltage to transistor $Q_a$ through resistor $R_a$ and capacitor $C_a$, which absorb the high frequency pulsation caused by chattering of the reed segments of the reed switch 3. The transistor $Q_a$ turns ON and OFF corresponding to the actual speed signal so that the voltage level at the connection point between resistor $R_b$ and $R_c$ changes according to the changes in the voltage level. Capicitor $C_b$ is charged through the resistor $R_b$ and discharged through the resistor $R_c$. The base and emitter of the transistor $Q_b$ are biased to the same voltage level through the diodes $D_a$ and $D_b$, respectively, and therefore, transistor $Q_b$ is in the OFF condition. When the voltage level at the connection point between resistors $R_b$ and $R_c$ changes it to a high level voltage H, the emitter of transistor $Q_b$ is biased higher than the base thereof for the time determined by the time constant of the resistor $R_b$ and capacitor $C_b$ so that the transistor $Q_b$ turns ON. The voltage at the collector of transistor $Q_b$ is normally at the low level and when the transistor $Q_b$ is turned ON the voltage at the collector changes to the high level so that the voltage at the collector of transistor $Q_b$ is at the high level for the time determined by the time constant of the resistence of resistor $R_b$ and the capacity of capicitor $C_b$ in each cycle of the frequency of the actual speed signal. The pulse signal which is of constant pulse width caused by transistor $Q_b$ is connected to an integrating circuit comprised of resistor $R_d$ and capacitor $C_c$ so that the voltage level of the capacitor $C_c$ corresponds to the repetition rate of the pulse which is proportional to the actual speed signal and indicates the actual speed voltage signal through transistor $Q_c$.

The memory circuit 50 memorizes the actual speed voltage signal which indicates the desired speed of the automobile. The memory circuit 50 includes a memory capacitor $C_d$, resistences $R_e$ and $R_f$ and field effect transistors (FET) $Q_d$ and $Q_e$ and transistor $Q_f$. The drain (source) of FET $Q_d$ receives either the voltage level of constant voltage $V_{cc}$ through a resistor $R_e$ or is at ground level through a resistor $R_f$. When the desired speed set signal is not supplied, the gate of FET $Q_d$ is at the low level whereby transistor $Q_f$ is in its ON state so that current cannot flow from the drain to the source. When the desired speed set signal is supplied, the voltage level of the gate of FET $Q_d$ switches to a high level whereby transistor $Q_f$ turns OFF so that current can flow from the drain to the source. One terminal of capacitor $C_d$ will then be connected to the connection point between resistor $R_e$ and resistor $R_f$ which indicate the reference voltage level $V_R$ and another terminal of capacitor $C_d$ receives an actual speed voltage signal $V_V$. Therefore, the voltage difference $V_V-V_R$ is charged in capacitor $C_d$. By taking off the desired speed set signal, FET $Q_d$ turns OFF since FET $Q_e$ is a high impedence element, a terminal of capacitor $C_d$ which is connected to FET $Q_d$ is in a floating state so that the electric charge of capacitor $C_d$ is held at the moment the desired speed set signal is taken off and therefore the differential voltage V of capacitor $C_d$ is held at the level of $V_V-V_R$. Thus, the voltage level $V_V+V$ is applied to the gate of FET $Q_e$ and is supplied from the source of FET $Q_e$ as the memory voltage signal $V_M$. Thereafter, if the actual speed of the automobile rises, the memory voltage signal $V_M$ rises correspondingly and upon decrease the memory voltage signal $V_M$ falls correspondingly. By comparing this memory voltage signal $V_M$ with the constant voltage level $V_x$, the difference signal between the actual automobile speed and the desired automobile speed is supplied and the automobile speed control system constantly maintains the actual automobile speed at the desired speed.

Figure 1C:
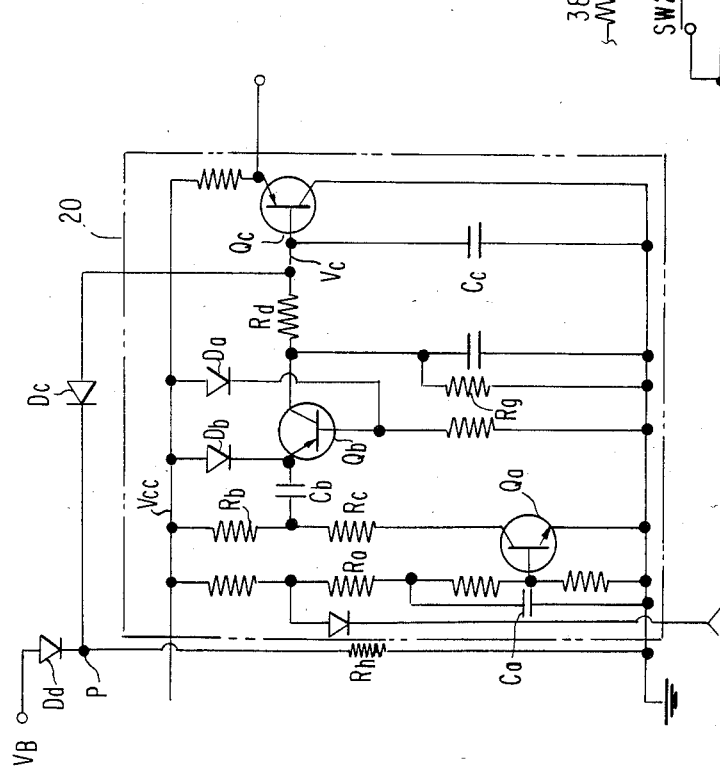
FIG. 1c is a circuit diagram showing the throttle valve position control system SVC as shown in FIG. 1a in detail.

With reference to FIG. 1c, the throttle valve position control system SVC is for an automobile equipped with an engine having an electronic fuel injector (EFI) to control the fuel injection by controlling the injection electrically. The output of the comparator 39 drives a vacuum actuator 6 through an amplifier circuit 5 and controls the output of the engine. A fuel injector 11 supplies fuel to the engine by means of signals from the EFI and an injection time signal generator circuit 13 generates the signals in response to the driving signals of the fuel injector 11. The amplifier circuit 5 is comprised of a transistor 41, the base of which is connected to the output of a comparator 39 through a resistor 42 and to the ground 19 through a resistor 43. The collector of transistor 41 is connected to the power voltage line $V_B$ through a solenoid coil 45 of a solenoid valve 44, the emitter thereof, and a diode 47 to ground. A stop switch 52 is connected with a brake pedal 51 and a terminal of the switch is grounded through a brake lamp LP. The base of a transistor 59 in the injection time signal generator circuit 13 is connected to the collector of a transistor 57 which drives a solenoid 56 of the fuel injector and the emittor of a transistor 59 is connected to the ground 19 and the collector of the transistor 59 is connected to the constant voltage line $V_{cc}$ through a resistor 160. The resistor 61 and a capacitor 62 form a low pass filter and a terminal of the resistor 61 is connected to the collector of the transistor 59 and another terminal thereof is connected to the capacitor 62. Another terminal of the capacitor 62 is connected to the ground 19. The connection point of the capacitor 62 and the resistor 61 is connected to the resistor 38 and a diode 63 which is connected to the set switch $SW_2$. The electronic fuel injection EFI includes sensors for detecting the ignition repetition rate, intake airflow rate, intake air temperature, starter voltage, cooling water temperature, throttle position, battery voltage, etc.

The electronic fuel injection EFI also includes electric circuit means for calculating fuel quantity to be supplied to the engine on the basis of engine operation logic or program and engerizing output power transistor 57. A surge absorbing diode 167 is connected to both ends of the solenoid coil 45.

The servo control motor 6 is comprised of a solenoid valve 44 and the vacuum actuator 69. The vacuum actuator 69 is comprised of a diaphragm 72 clamped between the housing HS and the cover 71. A pressure plate 74 is secured to the right hand side of a diaphragm 72 at the center thereof by means of a rivet 75 and a complementary retainer 73. The left side of the diaphragm is disposed in communication with the atmosphere and a pressure chamber 77 is defined between the diaphragm 72 and the housing HS. The pressure chamber is in communication with a port 79 of the solenoid valve 44 by means of a pipe 78. A normally closed port PO of the solenoid valve 44 is disposed in communication with the intake manifold 86 of the engine through a pipe 82 having a restrictive orifice 81 therein. A normally open port 83 of the valve 44 is disposed in communication with the atmosphere by means of a conduit having a restrictive orifice 84 therein and an air filter 85 on the outer end thereof. A chain 87 is connected to the retainer 73 at one end and is operatively connected to an operating link 89 for a throttle valve 88. The accelator pedal AP is connected to the end of the operating link 89 opposite the throttle valve 88 and a return spring 91 is secured between a fixed frame and the operating link 89 for normally biasing the throttle valve to the closed position as shown in FIG. 1c. The dotted line 92 associated with the intake manifold 86 indicates tnat the fuel injector 11 is fixed at the intake side of the engine while fuel is supplied through the opposite ends of the fuel injector 11 in the direction of the arrow 93. A similar injection time signal generator circuit is disclosed in U.S. Pat. No. 4,232,757 granted Nov. 11, 1980.

By closing the set switch $SW_2$, the capacitor 62 is discharged through the diode 63 and by opening the set switch $SW_2$ the memory capictor $C_d$ memorizes the actual speed signal. At this time, the memory voltage signal $V_M$ is applied to the negative input terminal of the comperator 39 when the memory voltage signal $V_M$ is lower than the voltage $V_x$. The comperator 39, therefore, supplies high voltage to turn ON transistor 41. However, the speed signal from speed signal generator 1 to the minus input terminal of comparator 39 has ripple theron. Therefore, the output of comparator 39 pulsates. The high duration of pulsation corresponds to the difference between the voltage level at the minus input terminal and plus input terminal of comparator 39. Thus, transistor 41 is energized to turn ON and OFF alternately and the ON duration corresponds to the voltage difference at the input terminals of comparator 39. Coil 45 in servomotor 6 is energized during the ON state of transistor 41, and forces solenoid valve 44 to connect pipe 78 to pipe 82 so as to supply the vacuum pressure in intake manifold 86 to compartment 77 of vacuum actuator 69. On the contrary, spring 83, during the OFF state of transistor 41, forces solenoid valve 44 to connect pipe 78 to air cleaner 85 so as to supply atmospheric pressure into compartment 77 of vacuum actuator 69. Thus, solenoid valve 44 vibrates in response to energization and deenergization of coil 45, i.e., ON, OFF of transistor 41. Therefore, vacuum pressure in compartment 77 of vacuum actuator 69 corresponds to the ON duration of transistor 41, namely, voltage difference at the input terminals of comparator 39. Diaphragm 72 is forced to move in response to vacuum pressure in compartment 77. thus the position or opening of throttle valve 88 corresponds to the ON duration of transistor 41, namely, voltage difference at the input terminals of comparator 39. In a short time after momentary closure of set switch $SW_2$, the ON duration of transistor 41 increases because of the larger voltage difference at the input terminals of comparator 39, and vacuum pressure in compartment 77 may also increase. However, solenoid valve 44 and vacuum actuator 69 have a delay time for responding to the energization of coil 45. This delay time is adjusted by orifices 81 and 84. Within the delay time, capacitor 62 in injection time signal generator circuit 13 is charged to a level which corresponds to the fuel injection control signal from EFI 10, The voltage level on capacitor 62 rises to the voltage level at the minus input terminal of comparator 39, whereby the ON duration of transistor 41 decreases. The rise of voltage at the minus input terminal of comparator 39 is smooth. Therefore, increase in vacuum pressure in compartment 77 of vacuum actuator 69 is prevented, and the pressure stabilizes at a value which holds throttle valve 88 at a position at which the actual automobile speed balances with the desired speed memorized on memory capacitor $C_d$. Thereafter, the automobile runs at the constant speed memorized on capacitor $C_d$. Assuming that the automobile runs up a slope and the actual speed falls below the constant speed, the voltage level at the minus imput terminal of comparator 39 falls and the high level duration of the output signal of comparator 39 becomes longer than before, whereby vacuum pressure in compartment 77 increases to increase the opening of throttle valve 88. Thus, the actual automobile speed rises. On the contrary, assuming that the automobile runs down a slope and the actual speed rises above constant speed, the voltage level at the minus input terminal of comparator 39 rises, and the high level duration of the output signal of comparator 39 becomes shorter than before, whereby vacuum pressure in compartment 77 increases to decrease the opening of throttle valve 88. Thus, the actual automobile speed falls. At this speed control stage, over-acceleration or deceleration may occur because of time lag in the operation of solenoid valve 44 and vacuum actuator 69. Also, so-called hunting, overshoot or undershoot may occur, due to the over-acceleration and deceleration. However those are prevented by the feedback signal from the injection time signal generator circuit 13, because capacitor 62 supplies a negative feedback signal to the minus input terminal of comparator 39. Therefore, assuming that actual speed falls below the desired speed memorized on capacitor 34 and comparator 39 energizes transistor 41 to turn ON in a relatively long time, then the vacuum pressure in compartment 77 gradually increases and throttle valve 88 gradually moves toward its full open position. Thus, intake air flow of the engine 7 increases gradually, and is detected by EFI 11. EFI 11 therefore increases the energization interval of coil 56 and the voltage of capacitor 62 rises gradually. Therefore, the voltage level at the minus input terminal of comparator 39 gradually rises in response to increase in the opening of throttle valve 88. Therefore, the ON duration of transistor 41 gradually becomes shorter. And finally, increase in vacuum pressure in compartment 77 stops, and throttle valve 88 stops, at a new position at which the actual automobile speed balances with the desired speed memorized on capacitor 34. As described above, the voltage level on capacitor 62 rises to prevent over-acceleration. Air flow rate and fuel supply are parameters of driving torque of the engine and are fed back to comparator 39. Assuming that actual speed rises above desired speed and the ON duration of transistor 41 decreases, the intake air flow rate decreases. Then the energization duration of coil 56 is decreased by EFI 10 and the voltage level of capacitor 62 falls to increase the ON duration of transistor 41, which prevents over-deceleration. The operations of EFI 10, injection time signal generator circuit 13 and comparator 39 are in the phase leading mode against alteration of actual automobile speed, and are quite quick as compared with operation of vacuum actuator 69. Therefore, position control of throttle valve 69 is smooth and stabilized.

Figure 2:
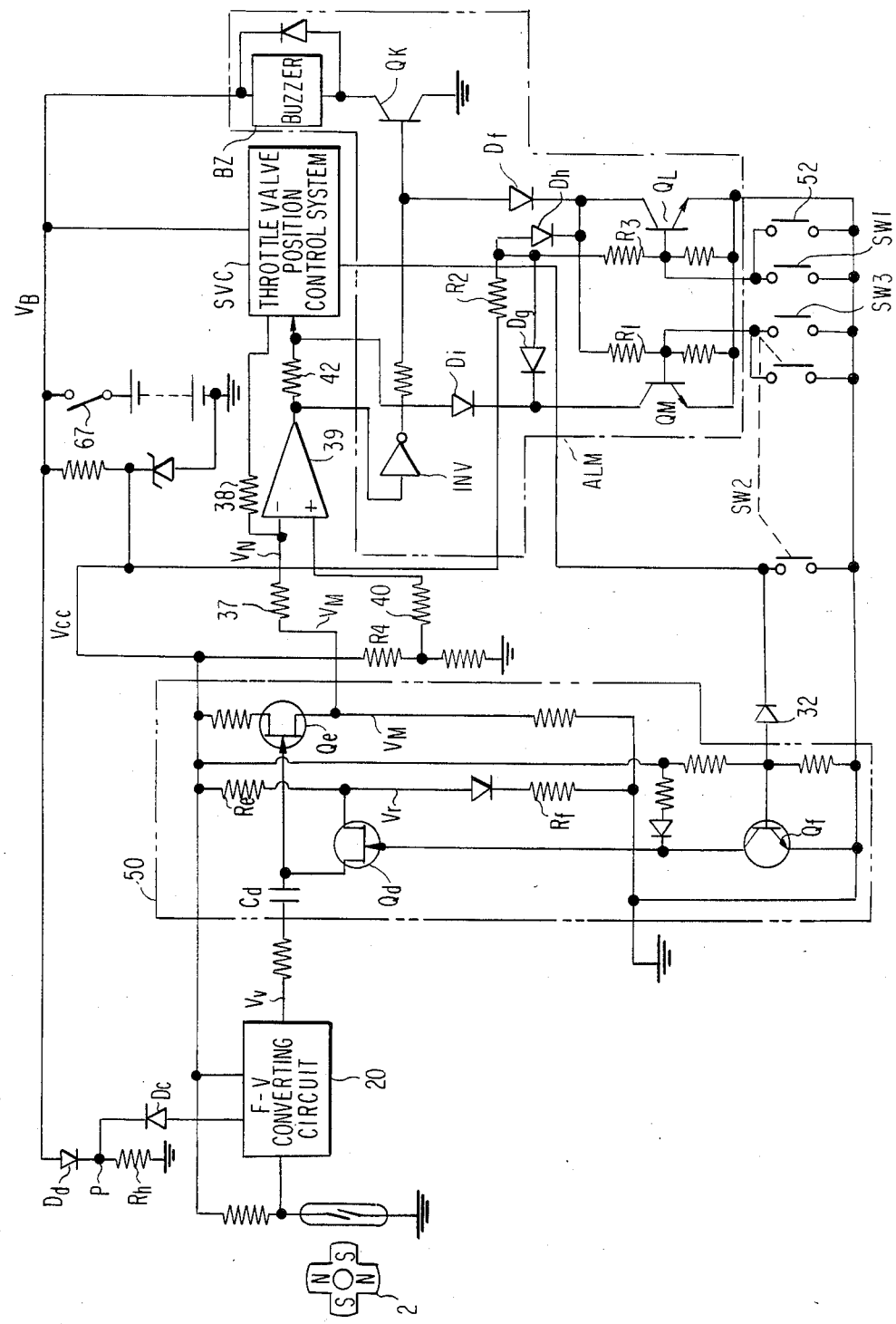
FIG. 2 is a circuit diagram showing a second embodiment of the present invention.

FIG. 2 is a circuit diagram showing a modified embodiment of the present invention wherein an inverter INV is substituted for the comparator CMP of FIG. 1a. The input of the inverter INV is connected to output of the comparator 39 and the output of the inverter INV is connected to the base of the transistor $Q_K$. The output of the comparator CMP (FIG. 1a) becomes a low level signal when the output of the comparator 39 is at a high level ($V_N < V_x$) and becomes a high level signal when the output of the comparator 39 is at a low level ($V_N > V_x$). Therefore, the same signal as that obtained by the comparator CMP can be obtained by using the inverter INV to invert the output of the comparator 39.

In the foregoing embodiments the alarm speed is set at the desired speed of the constant speed control system. However, it is possible to compare the actual speed voltage signal with any predetermined voltage. The voltage may be obtained from the voltages corresponding to each speed such as 50, 60, 70, etc. km/h by merely changing a rotary switch.

As will be understood from the foregoing description, it is easy to add the function of the alarm circuit without unduly increasing the number of circuit elements. Furthermore, the constant speed control system effectively functions even when the constant speed control is released.

Obviously, many modifications and variations of the present invention are possible in light of the above teaching. It is therefore to be understood that within the scope of the appended claims the invention may be practiced otherwise than as specifically disclosed.

What is claimed is:

1. An automobile speed control system for automatically controlling the speed of an automobile having memory and cancel circuits comprising:
   a speed generator circuit for generating a first electrical signal indicative of actual automobile speed;
   desired automobile speed signal supply circuit means for supplying a second electric signal indicative of the desired automobile speed;
   first comparator circuit means having a first input connected to said first electrical signal and a second input connected to said second electrical signal for generating an engine throttle control signal from said first and second signals;
   alarm means; and
   switching means connected to the output of said comparator for driving said alarm means when the actual automobile speed exceeds a predetermined speed during a period when a said second signal has been stored in said memory circuit but said cancel circuit is operative to prevent said speed control system from controlling the speed of said automobile.

2. An automobile speed control system as set forth in claim 1 wherein the predetermined speed is the desired automobile speed.

3. An automobile speed control system as set forth in claim 1 wherein the switching means comprises second comparator circuit means connected to said first and second electrical signals such that said inputs of said second comparator circuit means are connected in reverse order relative to said inputs of said first comparator circuit means for generating a switching signal; and
   a transistor responsive to said switching signal for energizing said alarm means.

4. An automobile speed control system as set forth in claim 1 wherein said switching means comprises an inverter circuit for generating a switching signal; and
   a transistor responsive to said switching signal for energizing said alarm means.

* * * * *